Feb. 10, 1931.  R. F. HAMPTON  1,791,723
COMBINED FISHHOOK AND BAIT CLAMP
Filed April 29, 1929

Inventor
R. F. HAMPTON
By Eccleston & Eccleston,
Attorneys

Patented Feb. 10, 1931

1,791,723

UNITED STATES PATENT OFFICE

ROBERT F. HAMPTON, OF TACOMA, WASHINGTON

COMBINED FISHHOOK AND BAIT CLAMP

Application filed April 29, 1929. Serial No. 359,114.

The present invention relates to fish hooks and more especially to such hooks as are used in fishing for the larger types of fish such as salmon.

An object of the invention resides in the provision of a simple and inexpensive mechanism forming a permanent part of a fish hook and by means of which the bait, such as a small fish, will be securely held in position on the hook.

A further object of the invention consists in providing a device by which the bait may be held in the most advantageous position with respect to the point of the hook, and will present the appearance of a fish swimming through the water.

Another object of the invention is the design of a bait clamp which is extremely simple in operation, requires a minimum number of manipulations in applying the bait, and will firmly hold the bait in its initial position until purposely released.

Figure 1:
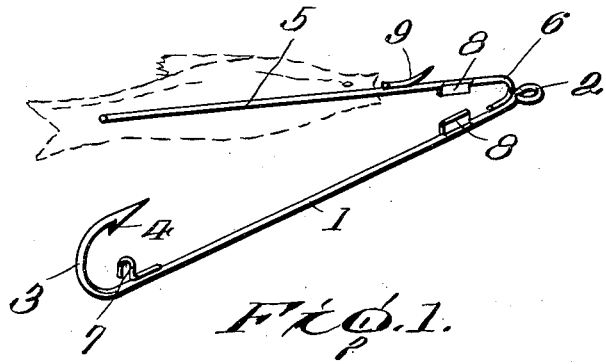
Figure 2:
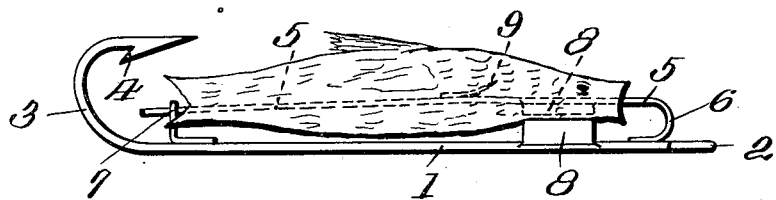

Other objects and advantages of the invention will be apparent from the following description when taken in connection with the accompanying drawing; in which Figure 1 is a perspective view of the fish hook and clamp, showing the first step in applying the bait to the hook; and Figure 2 is a side elevational view of the hook with the bait securely clamped in position and ready for use.

Referring to the drawing in greater detail the numeral 1 indicates the shank portion of a fish hook provided with an eye 2 for anchoring the fishing line, and the usual hooked end 3 provided with barb 4.

This invention is intended more especially for use with fish for bait, as for instance herring, and it is desirable that the bait be positioned on the hook so as to simulate the appearance of a live fish as the hook is drawn through the water. To this end a needle 5 of resilient material is provided with a bowed end 6 and secured to the shank 1 adjacent the eye 2, so as to extend longitudinally of the shank. The normal position of the needle is as indicated in Figure 1.

For the purpose of securing the free end of the needle 5 in position for locking the bait on the shank 1, a clasp 7 is provided which cooperates with the needle in the manner of an ordinary safety pin. It is essential, however, that the pin be firmly held in locking engagement with the clasp to prevent accidental loss of the bait, and for this purpose abutments or blocks of metal 8 are provided. These abutments are arranged in cooperative relationship on the shank 1 and needle 5 and engage one another, when the needle is moved to locking position, prior to the needle reaching the plane of the clasp 7. It is therefore apparent that the abutments cause a tension to be stored up in the needle 5 when engaged under clasp 7 and thereby firmly hold the needle against disengagement from the clasp.

The abutments or gripping jaws 8 have another function in addition to that just described, i. e., they serve to clamp or grip between themselves a portion of the bait in a manner to be pointed out in the description of the operation of the device, and thereby not only serve as an additional securing means for the bait, but also as a means for properly positioning the bait to give it a natural appearance when in the water.

An additional securing means for the bait consists of a barb 9, over which the bait is passed and which functions to anchor the bait against longitudinal movement toward the free end of the needle.

In using the present improvement, the needle 5 being in the position indicated in Figure 1, the herring or other fish to be used as bait is threaded onto the needle in the manner indicated. In this operation it is only necessary that the point of the needle be directed into the mouth of the fish, and the fish moved along the needle toward its bowed end 6. As the fish passes the barb 9, which is directed away from the point of the needle, the barb will act as a detent to prevent movement of the bait in the opposite direction. The bait is then pushed further onto the needle until the abutment 8 on the needle 5 enters the mouth of the fish. The bait is now in proper position, and the free end of the needle is bent down toward the shank of the hook so as to engage under the clasp 7. In this movement of the needle the jaws 8—8 firmly clamp between themselves a portion of the bait and thus lock it against either a longitudinal or rotative movement with respect to the needle. Furthermore, this cooperative action between the abutments 8 stores up a substantial tension in the needle 5 and causes it to firmly engage the clasp 7 so as to prevent its accidental disengagement therefrom.

From the foregoing description taken in connection with the accompanying drawing it will be apparent to those skilled in the art that I have devised an exceedingly simple and inexpensive structure for securing bait to a fish hook; that it firmly grips the bait to hold the same in proper position to present the appearance of a live fish when drawn through the water; that it is so designed as to avoid any liability of loss of the bait, and that in use it provides a minimum number of operations in attaching the bait to the hook.

While I have described what I now believe to be the preferred embodiment of the invention, it will be understood that various minor changes may be made in the construction without departing from the spirit of the invention, and it is therefore intended that the present disclosure be considered as illustrative of the invention rather than in a limiting sense.

Having fully described my invention, what I claim as new and desire to secure by Letters Patent is:

1. A fish hook including a shank, a needle resiliently mounted on said shank on the side adjacent the barb of the hook, a clasp for the free end of said needle, and a barb on the needle intermediate its ends.

2. A fish hook including a shank, a needle resiliently mounted on said shank to extend longitudinally thereof, a clasp for the free end of said needle, and auxiliary means for placing said needle under tension when engaged by said clasp.

3. A fish hook including a shank, a needle resiliently mounted on said shank to extend longitudinally thereof, a clasp for the free end of said needle, and cooperating abutments on said needle and shank for placing said needle under tension when engaged by said clasp.

4. A fish hook including a shank, a needle having one end secured to said shank, a clasp for the free end of the needle, and cooperating elements on the needle and shank for gripping a bait threaded on said needle and for placing said needle under tension when engaged by said clasp.

5. A fish hook including a shank, a needle having one end secured to said shank, a clasp for the free end of the needle, cooperating elements on the needle and shank for gripping a bait threaded on said needle, and a barb on the needle for preventing longitudinal movement of the bait in one direction.

ROBERT F. HAMPTON.